Sept. 4, 1956 R. J. VIOLETTE 2,761,891

ELECTRICAL AND ELECTRONIC ENCAPSULATED CIRCUITRY

Filed Jan. 14, 1952

INVENTOR.
RICHARD J. VIOLETTE

BY Wm. H. Dean

AGENT

United States Patent Office 2,761,891

Patented Sept. 4, 1956

2,761,891

ELECTRICAL AND ELECTRONIC ENCAPSULATED CIRCUITRY

Richard J. Violette, El Cajon, Calif.

Application January 14, 1952, Serial No. 266,416

2 Claims. (Cl. 174—17)

My invention relates to electrical and electronic encapsulated circuitry and the objects of my invention are:

First, to provide an improved means for encapsulation of various electrical and electronic devices operating at relatively high temperatures.

Second, to provide electrical and electronic encapsulated circuitry having means for dissipating heat therefrom which is not adversely affected by relatively high temperatures and wherein provision is made for expansion of a liquid component of insulating material used.

Third, to provide electrical and electronic encapsulated circuitry wherein the electrical units are surrounded by pressurized granular material of non-conductive character in juxtaposition with the units.

Fourth, to provide electrical and electronic encapsulated circuitry wherein the circuit means is intimately surrounded by granular material maintained in pressurized condition and which is also free to expand and contract according to thermal variation without adversely affecting the circuit means around which it is intimately disposed.

Fifth, to provide electrical and electronic encapsulated circuitry in which the circuit means is surrounded and pressurized by granular material in a non-conducting liquid adapted to augment heat exchange from said circuit means preventing extreme heat concentration therein.

Sixth, to provide electrical and electronic encapsulated circuitry which is very durable and rugged mechanically, capable of wide thermal variation without loss of efficiency or undue change in electrical characteristics.

Seventh, to provide an electrical and electronic encapsulated circuitry of this class which is very simple and economical of construction, efficient in operation and which will not readily deteriorate or get out of order.

With these and other objects in view as will appear hereinafter my invention consists of certain novel features of construction, combination and arrangement of parts and portions as will be hereinafter described in detail and particularly set forth in the appended claims, reference being had to the accompanying drawings and to the characters of reference thereon forming a part of this application in which:

Similar characters of reference refer to similar parts and portions throughout the several views of the drawings.

Figure 1:
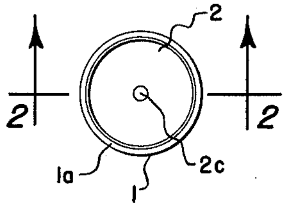
Fig. 1 is a top or plan view of my means for encapsulating electrical and electronic devices.
Figure 3:
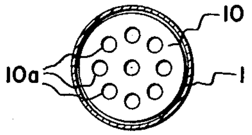
Fig. 3 is a reduced transverse sectional view taken from the line 3—3 of Fig. 2.

The casing 1, casing end members 2 and 3, insulator 4, conductors 5, circuit means 6, granular material 7, liquid 8, spring 9 and the plates 10 and 11 constitute the principal parts and portions of my electrical and electronic encapsulated circuitry.

Figure 2:
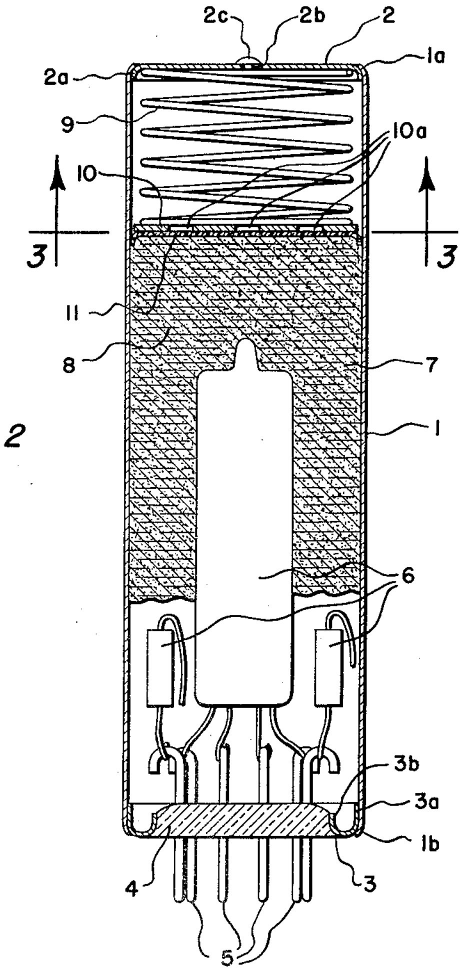
Fig. 2 is a longitudinal sectional view thereof taken from the line 2—2 and showing the same on enlarged scale.

The casing 1 as shown in Figs. 1 and 2 of the drawing is a hollow cylindrical casing which is circular in cross section. This casing 1 may be of rectangular shape or may be varied to fit a particular installation as desired. This casing 1 is preferably made of thin sheet metal and hermetically sealed in opposite ends thereof are the end members 2 and 3. It will be here noted that in some instances one of the end members may be integral with the casing 1 if desired. The end member 2 is a substantially disc-shaped sheet metal member having an annular inturned flange **2*a* positioned within the casing 1 and is secured in the end of the casing 1 by the overlapping inturned flange 1*a* of the casing 1 and also by soldering or other fusion as desired. The end member 2 is also provided with a central opening 2*b* through which the casing 1 may be evacuated and subsequently sealed hermetically by means of the fused metal plug 2*c*. In the opposite end of the casing 1 from the end member 2 is the end member 3. This end member 3 is ring-shaped and provided with inwardly directed flange portions 3*a* and 3*b*. The flange portion 3*a* is retained in the casing 1 by means of the overlapping inturned crimp or flange 1*b* and the end member 3 is also hermetically sealed within said flange 1*b* by means of fusion, preferably solder or the like. Cast internally of the flange 3*b* is the insulator 4. This insulator 4 may be of porcelain or any other suitable material which is fusable and readily cast within the end member 3 as shown in Fig. 2 of the drawings. The construction of the insulator 4 includes embedding of the conductors 5 during casting of the same so that these conductors 5 are hermetically sealed in the insulator 4 which is in turn hermetically sealed within the end member 3. Electrically connected with the conductors 5 is the electrical or electronic circuit means 6 which may be arranged to perform a desired circuit function and which may be, for example, two tubes representing a complete two-stage audio amplifier. Positioned within the casing 1 and intimately surrounding and engaging the circuit means 6 is a granular material 7 which may be crushed fused quartz or any other suitable material free of electrical conducting elements. This granular material 7 is saturated by a non conducting liquid such as a suitable transformer oil or the like designated 8 and illustrated by the conventional symbol in Fig. 2 of the drawings. Positioned in the casing 1 and intimately engaging the granular material 7 is the plate 11. This plate 11 is co-extensive with the internal cross sectional area of the casing 1 and is preferably made of foraminous insulating material such as woven glass or any other suitable material. Engaging this plate 11 is the substantially rigid plate 10 which may be made of metal or any other suitable rigid material. This plate 10 is provided with openings 10*a* therein adapted to provide passages for the liquid 8 during thermal expansion thereof as will be hereinafter described in detail. The spring 9 is a compression spring engaging the end member 2 and the plate 10 which constantly tends to exert pressure on the granular material 7 for maintaining the same intimately engaged with the circuit means 6 internally of the casing 1**.

The operation of my electrical and electronic encapsulated circuitry is substantially as follows:

When the conductors 5 are electrically connected in circuit with a certain electrical or electronic installation, operation of the circuit means 6 causes a certain amount of heat which is conducted by the granular material 7 to the casing 1. The liquid 8 which saturates the granular material 7 helps conduct such heat to the outer casing 1 which radiates said heat to the atmosphere. As the liquid 8 reacts thermally, it expands and passes through the foraminous plate 11 and through the openings **10*a* in the plate 10. Constant pressure of the spring 9 maintains the granular material 7** intimately engaged with the circuit means 6 and provides for resilient reaction to compensate for any thermal expansion of the granular material 7. It will be noted that during construction of my electrical and electronic encapsulated circuitry, the opening 2*b* in the end member 2 provides means for evacuating the air from the casing 1 after the granular material 7 and liquid 8 have been placed in the casing 1, and the fused material 2*c* provides means for hermetically sealing the casing 1 maintaining only a rarefied atmospheric condition therein while the granular material 7 and the liquid 8 are in surrounding intimate relationship with the circuit means 6. During operation of the circuit means 6 heat is dissipated therefrom as hereinbefore described and the granular material 7 is capable of withstanding relatively high temperatures in such circuit means while the liquid 8 is a non-conducting liquid such as transformer oil or the like and is also capable of withstanding relatively high temperatures for such circuit means. The intimate compressed condition of the granular material 7 maintained by the action of the spring 9 accomplishes a mechanically unitary arrangement of the casing 1 and the circuit means 6. This circuit means 6 may include very delicate elements which require support in order to resist the effects of vibration and thus the circuit means 6 even though composed of delicate elements assumes very rugged character.

Though I have shown and described a particular construction, combination and arrangement of parts and portions, I do not wish to be limited to this particular construction, combination and arrangement but desire to include in the scope of my invention the construction, combination and arrangement substantially as set forth in the appended claims.

Having thus described my invention, what I claim as new and desire to secure by Letters Patent is:

1. In encapsulated circuitry, a casing, circuit means therein, granular material surrounding said circuit means, means in said casing for compacting said granular material around said circuit means, an insulative closure for one end of said casing, and conductors projecting through said closure and connected with said circuit means internally of said casing, a non-conducting liquid in said granular material, said casing including a spring chamber, said means for pressurizing including a spring in said spring chamber and a foraminous means intermediate said granular material and said spring, whereby themal expansion of said liquid into said spring chamber is permitted.

2. In encapsulated circuitry, a hollow substantially rigid casing, circuit means therein, dielectric granular material intimately surrounding said circuit means and resilient means in said casing pressurizing said granular material into said intimate surrounding relationship with said circuit means, an insulative closure closing one end of said casing and hermetically sealed therein and conductors projecting through said closure and connected with said circuit means internally of said casing and the outwardly projecting ends of said conductors comprising electrical connections for installation of said circuit means with other electrical or electronic installations, and dielectric liquid enveloping said granular material and surrounding said circuit means, foraminous plate means intermediate said granular material and said resilient means adapted to retain said granular material in certain position and permit thermal expansion of said dielectric liquid therethrough and into a portion of said casing adjacent said resilient means.

References Cited in the file of this patent

UNITED STATES PATENTS

| | | |
|---|---|---|
| 1,759,971 | Austin | May 27, 1930 |
| 1,941,463 | Burnham | Jan. 2, 1934 |
| 2,079,231 | Smith | May 4, 1937 |
| 2,341,382 | Jensen | Feb. 8, 1944 |
| 2,394,329 | Pittman | Feb. 5, 1946 |

FOREIGN PATENTS

| | | |
|---|---|---|
| 559,846 | Great Britain | Mar. 8, 1944 |
| 578,869 | Great Britain | July 15, 1946 |